(12) United States Patent
Vilem et al.

(10) Patent No.: US 12,474,040 B2
(45) Date of Patent: Nov. 18, 2025

(54) LENS FOR AN INGRESS PROTECTED STAGE LUMINAIRE

(71) Applicant: ROBE lighting s.r.o., Roznov pod Radhostem (CZ)

(72) Inventors: Jan Vilem, Valasske Mezirici (CZ); Tomas David, Podoli (CZ); Tomas Micunek, Roznov pod Radhostem (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 18/620,146

(22) Filed: Mar. 28, 2024

(65) Prior Publication Data
US 2024/0240783 A1    Jul. 18, 2024

Related U.S. Application Data

(60) Provisional application No. 63/493,230, filed on Mar. 30, 2023.

(51) Int. Cl.
*F21V 31/00* (2006.01)
*F21V 5/04* (2006.01)
(Continued)

(52) U.S. Cl.
CPC ............ *F21V 31/005* (2013.01); *F21V 5/045* (2013.01); *F21V 21/30* (2013.01); *F21V 29/50* (2015.01)

(58) Field of Classification Search
CPC ........ F21V 31/005; F21V 5/045; F21V 21/30; F21V 29/50
See application file for complete search history.

(56) References Cited

U.S. PATENT DOCUMENTS 3,484,599 A * 12/1969 Little ..................... G02B 3/005
    362/268
4,070,105 A *  1/1978 Marzouk ................. G02C 7/02
    351/159.62
(Continued)

FOREIGN PATENT DOCUMENTS

CN    102023470 A    4/2011
EP       1395053 A1   3/2004
(Continued)

OTHER PUBLICATIONS

European Extended Search Report; Application No. 24167872.1; Sep. 9, 2024; 9 pages.

*Primary Examiner* — Tsion Tumebo
(74) *Attorney, Agent, or Firm* — Conley Rose, P.C.; Brooks W Taylor

(57) ABSTRACT

A lens assembly and luminaire are provided. The luminaire includes a head comprising the lens assembly, where the lens assembly includes a lens holder, a Fresnel lens, and a homogenizing lens. The Fresnel lens is physically coupled to the lens holder and includes a smooth rear face and a front face comprising annular facets. The homogenizing lens is physically coupled to the lens holder and optically coupled to the Fresnel lens. The homogenizing lens includes a rear face comprising a homogenizing optical structure and the rear face of the homogenizing lens faces the front face of the Fresnel lens.

20 Claims, 5 Drawing Sheets

(51) Int. Cl.
*F21V 21/30* (2006.01)
*F21V 29/50* (2015.01)

(56) References Cited

U.S. PATENT DOCUMENTS

| | | | | |
|---|---|---|---|---|
| 5,506,762 | A * | 4/1996 | Ziegler | F21S 10/007 |
| | | | | 362/311.06 |
| 6,785,048 | B2 * | 8/2004 | Yamaguchi | G03B 21/62 |
| | | | | 359/557 |
| 6,947,212 | B2 * | 9/2005 | Karasawa | G03B 21/10 |
| | | | | 348/E5.143 |
| 7,379,240 | B2 * | 5/2008 | Iwaki | G03B 21/62 |
| | | | | 359/457 |
| 8,641,230 | B1 * | 2/2014 | Jiang | G02B 19/0061 |
| | | | | 264/1.7 |
| 2004/0252520 | A1 * | 12/2004 | Martineau | F21V 29/70 |
| | | | | 362/800 |
| 2008/0007827 | A1 | 1/2008 | Kinoshita et al. | |
| 2009/0109530 | A1 * | 4/2009 | Michimori | G03B 21/62 |
| | | | | 359/446 |
| 2011/0134636 | A1 * | 6/2011 | Chang | G08G 1/095 |
| | | | | 362/235 |
| 2012/0051058 | A1 * | 3/2012 | Sharma | F04B 43/046 |
| | | | | 362/294 |
| 2016/0047533 | A1 * | 2/2016 | Jurik | F21V 14/06 |
| | | | | 362/332 |
| 2017/0343185 | A1 * | 11/2017 | Fieberg | F21V 5/045 |
| 2019/0278045 | A1 * | 9/2019 | Manushi | G02B 7/021 |
| 2019/0329803 | A1 * | 10/2019 | Beier | B61L 5/1845 |
| 2019/0338922 | A1 * | 11/2019 | Jurik | F21V 14/06 |
| 2020/0236759 | A1 * | 7/2020 | Jurik | F21V 29/51 |

FOREIGN PATENT DOCUMENTS

| | | |
|---|---|---|
| EP | 1536278 A1 | 6/2005 |
| EP | 2924344 A1 | 9/2015 |

\* cited by examiner

LENS FOR AN INGRESS PROTECTED STAGE LUMINAIRE

CROSS-REFERENCE TO RELATED APPLICATIONS

This patent application claims the benefit of U.S. Provisional Application No. 63/493,230, filed Mar. 30, 2023, entitled "LENS FOR AN INGRESS PROTECTED STAGE LUMINAIRE" which is hereby incorporated by reference in its entirety.

TECHNICAL FIELD OF THE DISCLOSURE

The disclosure generally relates to luminaires, and more specifically to a lens for an outdoor stage luminaire.

BACKGROUND

Luminaires in outdoor settings for entertainment and/or architectural applications may be used for theatrical productions, festivals, television and film productions, concerts, theme parks, sporting events, and other outdoor venues. Ingress Protection (IP) ratings for electrical enclosures are defined by the International Electrotechnical Commission (IEC) under the international standard IEC 60529, published in the European Union as EN 60529. IP ratings indicate levels of sealing effectiveness of electrical enclosures against intrusion from foreign bodies (such as dust and dirt) and moisture (such as fluids, droplets, or vapor). An outdoor luminaire at least partially protected against weather and rain may be designed with a rating such as IP65. Such luminaires may be used in a position exposed to weather in order to light performers, audience, scenery, or staging.

SUMMARY

A lens assembly includes a lens holder, a Fresnel lens, and a homogenizing lens. The Fresnel lens is physically coupled to the lens holder and includes a smooth rear face and a front face comprising annular facets. The homogenizing lens is physically coupled to the lens holder and optically coupled to the Fresnel lens. The homogenizing lens includes a rear face comprising a homogenizing optical structure and the rear face of the homogenizing lens faces the front face of the Fresnel lens.

A luminaire includes a head comprising a lens assembly, where the lens assembly includes a lens holder, a Fresnel lens, and a homogenizing lens. The Fresnel lens is physically coupled to the lens holder and includes a smooth rear face and a front face comprising annular facets. The homogenizing lens is physically coupled to the lens holder and optically coupled to the Fresnel lens. The homogenizing lens includes a rear face comprising a homogenizing optical structure and the rear face of the homogenizing lens faces the front face of the Fresnel lens.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Figure 1:
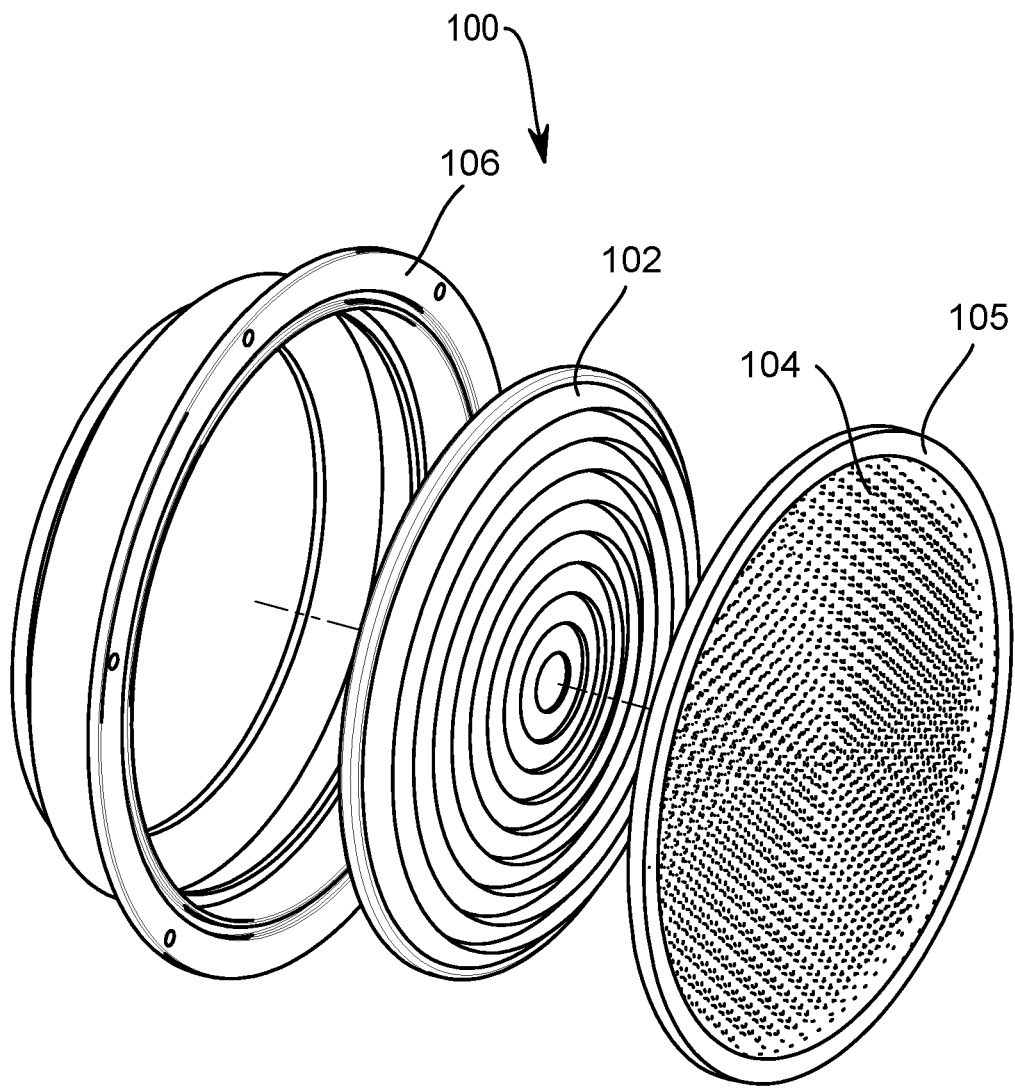
FIG. 1 presents an exploded view of a lens assembly according to the disclosure.

Preferred embodiments are illustrated in the figures, like numerals being used to refer to like and corresponding parts of the various drawings.

Outdoor luminaires may be used in theatrical productions, festivals, television and film productions, concerts, theme parks, sporting events, and other outdoor venues. Such luminaires may be controlled from a remotely positioned lighting desk that allows an operator to send commands via a data link to control luminaire characteristics such as position, color and intensity, patterns, and/or effects of the emitted light.

Some outdoor luminaires use a type of lens known as a Fresnel lens as a final output lens—the lens through which the luminaire emits light. Fresnel lenses are a design alternative for plano-convex lenses with short focal lengths. Fresnel lenses provide a design that reduces the material and weight of the lens. The structure of a Fresnel lens comprises a planar or concave rear face and a series of concentric, faceted, annular (ring-shaped) sections on the front face of the lens. The facets are designed to simulate the optical effect of the convex front face of the plano-convex lens. The side of each facet that is closer to the center of the lens is substantially vertical (parallel to the optical axis). The side of each facet that is farther from the center of the lens has an angle to the optical axis that is substantially the same as the angle of a corresponding annular portion of the convex front face of the lens being simulated. Fresnel lenses may be molded into a single piece of glass or plastic.

A first technical problem with the annular facets of a Fresnel lens is that they may provide an imperfect simulation of the original convex surface. The imperfect simulation may produce a ringed pattern in the output light beam. Discontinuities between adjacent faceted rings may be one cause of the ringed pattern. In some lenses, the effect of the discontinuities is reduced by using a homogenizing optical pattern on the rear face of the lens (the surface opposite the annular facets). Such a homogenizing optical pattern may be a series of small dimples or raised bumps that break up the light so that the ringed pattern is diffused and/or eliminated. However, such a homogenizing pattern on the rear face of the lens affects the light beam before the beam passes through the annular facets, with the possible result that the annular facets produce a ringed pattern that is reduced, but still perceptible, in the light beam. A lens system according to the present disclosure solves this first problem by providing a homogenizing optical structure after the annular facets in the light path, rather than before the annular facets.

It is desirable that the external lenses of outdoor entertainment luminaires be kept clean so as not to reduce their light output. Thus, a second technical problem arises in luminaires having a Fresnel lens as the final output lens, because the faceted face of a Fresnel lens may be exposed to the weather and atmosphere, with the result that the facets may become coated with dirt and/or moisture. Because of the irregular surface created by the facets, the front surface of the lens may be difficult to clean. A lens system according to the present disclosure solves this second problem by shielding the annular facets from dirt and moisture.

FIG. 1 presents an exploded view of components of a lens assembly 100 according to the disclosure. A Fresnel lens 102 and a homogenizing lens 104 are mounted in (or physically coupled to) a lens holder 106. Light from a light source passes through the Fresnel lens 102 before passing through the homogenizing lens 104 and being emitted from a luminaire comprising the lens assembly 100. The Fresnel lens 102 includes a smooth surface on its rear (light receiving) face and annular facets on its front (light emitting) face. The homogenizing lens 104 includes a homogenizing optical structure on its rear face and a smooth front face. The homogenizing lens 104 includes a rim 105 which is sealed via gaskets or otherwise to the lens holder 106, and thus to the body of the luminaire. The seal between the rim 105 and the lens holder 106 is configured to prevent (or reduce) the ingress of dust and/or moisture into the luminaire around the edge of the homogenizing lens 104. However, the Fresnel lens 102 is not sealed to the lens holder 106 or the homogenizing lens 104. As a result, air circulates freely from within the luminaire, around the edges of the Fresnel lens 102, and between the Fresnel lens 102 and the homogenizing lens 104 to reduce or eliminate a buildup of condensation between the two lenses.

Figure 2:
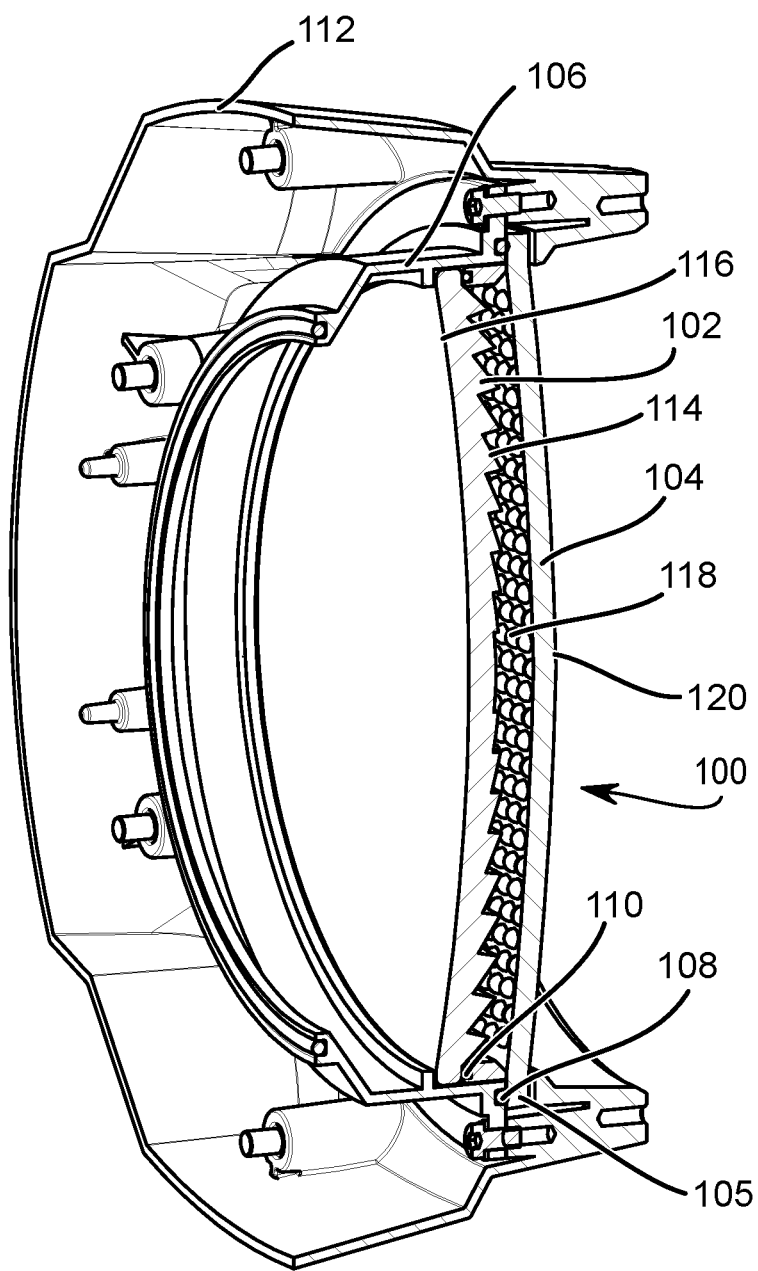
FIG. 2 presents an oblique side cut-away view of the lens assembly of FIG. 1.

FIG. 2 presents an oblique side cut-away view of the components of the lens assembly 100 of FIG. 1. The lens holder 106 which, in turn, is mounted to a body 112 of a luminaire. The Fresnel lens 102 and the homogenizing lens 104 are physically coupled to the lens holder 106. As described above, light from a light source within the luminaire passes through the Fresnel lens 102 before passing through the homogenizing lens 104 and being emitted from the luminaire. The Fresnel lens 102 is not sealed into lens holder 106, but instead is mounted using a mount 110 comprising a resilient material, which allows airflow around the Fresnel lens 102. The Fresnel lens 102 comprises a smooth rear face 116 that may be flat (i.e., not curved), convex, concave or any other smooth shape. A front face 114 of the Fresnel lens 102 includes annular facets.

The homogenizing lens 104 is mounted in the lens holder 106, with a rear face 118 facing the front face 114 of the Fresnel lens 102. The rim 105 of the homogenizing lens 104 is sealed to the lens holder 106 by a gasket 108. The rear face 118 of the homogenizing lens 104 comprises a homogenizing optical structure. The homogenizing optical structure may include a pattern of dimples, raised bumps, or other optical structure configured to homogenize light. The homogenizing optical structure may be formed of the material of the rear face 118 or be a coating or thin layer applied on the rear face 118. The rear face 118 may be flat, convex, concave, or other shape. The homogenizing lens 104 comprises a smooth front face 120. The front face 120 may be flat, convex, concave or any other shape.

In some embodiments, the front face 120 of the homogenizing lens 104 comprises an anti-reflection coating. In various embodiments, the front face 120 of the homogenizing lens 104 comprises one or more of an oleophobic coating, a hydrophobic coating, or a coating configured to (i) strengthen the lens, (ii) increase the lens' resistance to scratches, and/or (iii) reduce a buildup of dirt and dust on the surface of the lens.

Figure 3A:
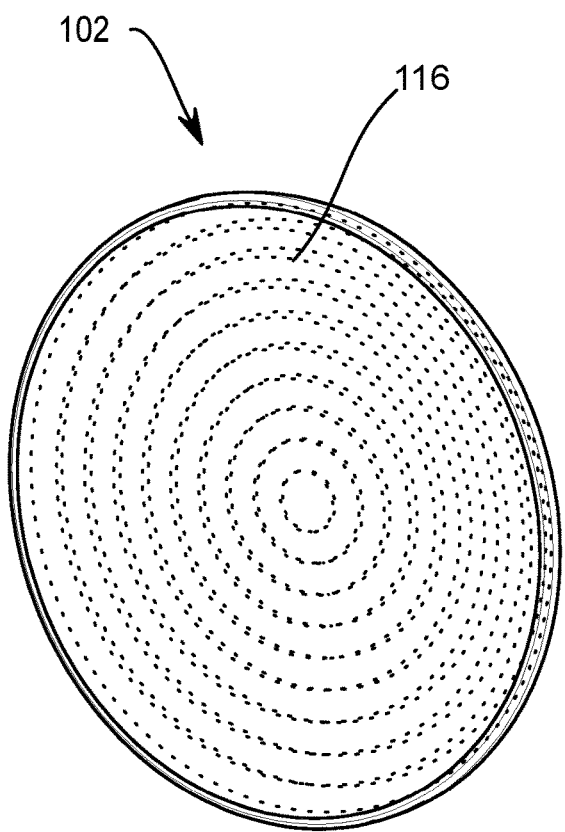
FIGS. 3A and 3B present views of rear and front faces, respectively, of a Fresnel lens according to the disclosure.
Figure 3B:
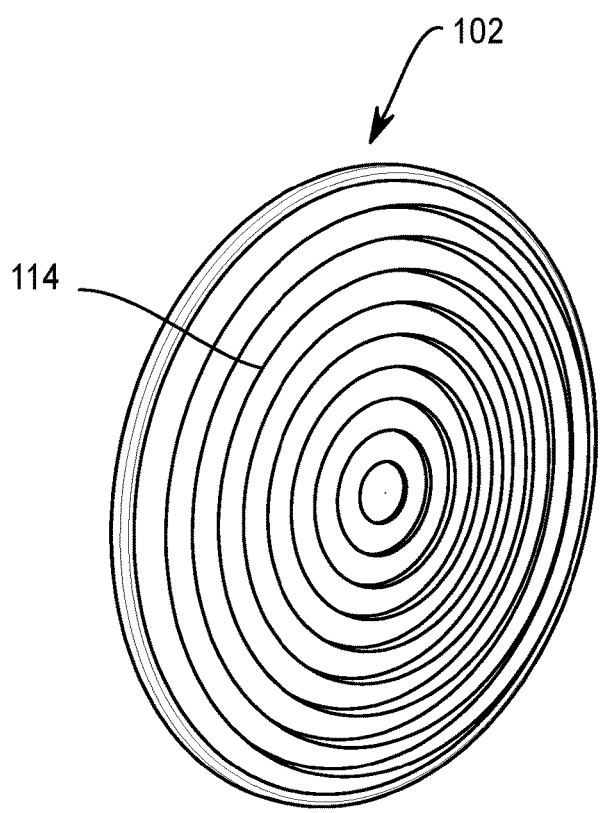

FIGS. 3A and 3B present views of the rear face 116 and the front face 114, respectively, of the Fresnel lens 102 according to the disclosure. FIG. 3A shows the smooth rear face 116 and FIG. 3B shows the annular facets of the front face 114. The annular facets are visible through the rear face 116.

Figure 4A:
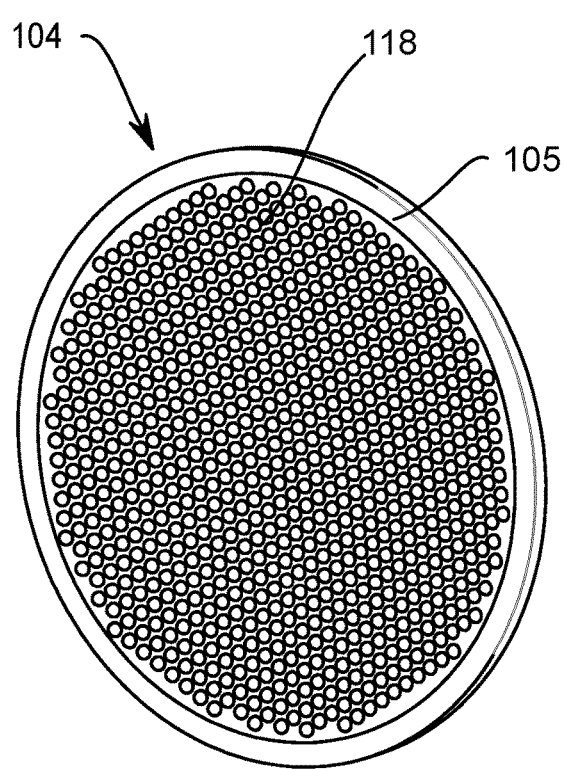
FIGS. 4A and 4B present views of the rear and front faces, respectively, of a homogenizing lens according to the disclosure.
Figure 4B:
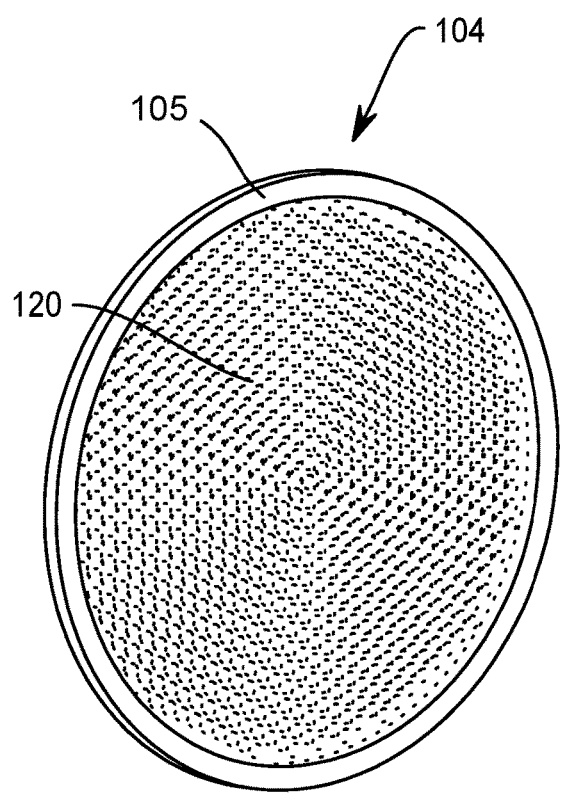

FIGS. 4A and 4B present views of the rear face 118 and the front face 120, respectively, of the homogenizing lens 104 according to the disclosure. FIG. 4A shows the rear face 118 with a homogenizing optical structure comprising raised dimples. As described above, the homogenizing optical structure may comprise a pattern of dimples, raised bumps, or other optical structure configured to homogenize light. The homogenizing optical structure may be formed of the material of the rear face 118 or be a coating or thin layer applied on the rear face 118.

FIG. 4B shows the smooth front face 120. The dimples on the rear face 118 are visible through the front face 120. The homogenizing lens 104 includes a rim 105 that may be used for sealing the homogenizing lens 104 to the lens holder 106 to reduce or prevent the passage of air around an edge of the homogenizing lens, e.g., the passage of outside air into an interior of the luminaire 112.

In some embodiments, homogenizing optical structures are located on both the front face 120 and the rear face 118 of the homogenizing lens 104. In other embodiments—for example, where the luminaire will be exposed to little or no dust or moisture—the homogenizing optical structure is located on the front face 120 and the rear face 118 is smooth.

Figure 5:
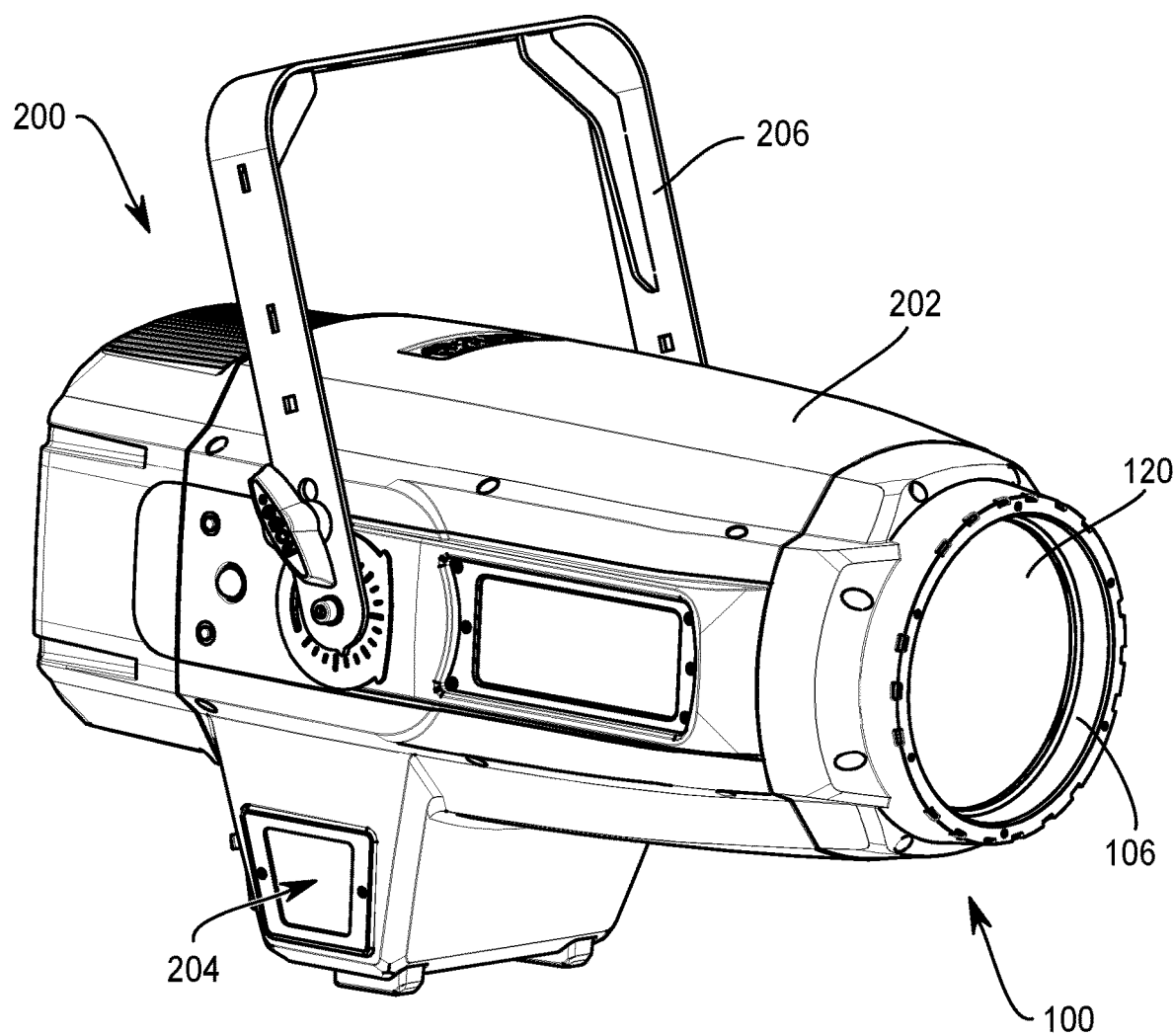
FIG. 5 presents an orthogonal view of a luminaire comprising a lens assembly according to the disclosure.

FIG. 5 presents an orthogonal view of a luminaire 200 comprising the lens assembly 100 according to the disclosure. The lens holder 106 is mounted with the smooth front face 120 of the homogenizing lens 104 facing outward to emit light from the luminaire 200.

The luminaire 200 comprises a head 202 and electrical circuits 204 (not visible in FIG. 5). The electrical circuits 204 are configured to provide electrical power to a light engine and control circuits and motors configured to move the optical devices of the luminaire 200. The luminaire 200 is a fixed position luminaire whose pan/tilt orientation is set by manually positioning the head 202 in a stirrup 206.

In other embodiments, an automated luminaire according to the disclosure comprises a head in which the lens assembly 100 is mounted. In such embodiments, the head is rotatably mounted in a motorized yoke assembly and configured for remotely controlled rotation about a tilt axis. The yoke assembly is rotatably mounted to a base and configured for remotely controlled rotation about a pan axis. In some such embodiments, the base may include power circuits configured to provide electrical power to electrical circuits of one or more of the base, the yoke assembly, and the head.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A lens assembly, comprising:
   a lens holder;
   a Fresnel lens physically coupled to the lens holder to allow airflow around the Fresnel lens, the Fresnel lens including a smooth rear face and a front face comprising annular facets; and
   a homogenizing lens physically coupled to the lens holder and optically coupled to the Fresnel lens, the homogenizing lens including a rear face comprising a homogenizing optical structure, the rear face of the homogenizing lens facing the front face of the Fresnel lens, wherein the homogenizing lens is physically coupled to the lens holder to reduce airflow around an edge of the homogenizing lens, wherein the lens holder is configured to hold the Fresnel lens and the homogenizing lens in a fixed and spaced-apart relationship and to allow airflow between the Fresnel lens and the homogenizing lens.

2. The lens assembly of claim 1, wherein the homogenizing lens is physically coupled to the lens holder at least by a seal configured to reduce passage of air around the edge of the homogenizing lens.

3. The lens assembly of claim 2, wherein the seal comprises a gasket.

4. The lens assembly of claim 2, wherein the Fresnel lens is physically coupled to the lens holder at least by a resilient material configured to allow airflow around the Fresnel lens.

5. The lens assembly of claim 1, wherein the homogenizing lens comprises a smooth front face.

6. The lens assembly of claim 1, wherein the homogenizing optical structure comprises raised dimples.

7. The lens assembly of claim 1, wherein the homogenizing optical structure comprises a pattern of dimples, raised bumps, or other optical structure configured to homogenize light.

8. The lens assembly of claim 1, wherein the homogenizing optical structure is formed of a material of the rear face or is a coating or thin layer applied on the rear face of the homogenizing lens.

9. The lens assembly of claim 1, wherein the front face of the homogenizing lens comprises an oleophobic coating, a hydrophobic coating, a coating configured to strengthen the homogenizing lens, a coating configured to increase a resistance of the homogenizing lens to scratches, or a coating configured to reduce a buildup of dirt and dust on a surface of the homogenizing lens.

10. A luminaire comprising:
a head comprising a lens assembly, wherein the lens assembly comprises:
a lens holder;
a Fresnel lens physically coupled to the lens holder to allow airflow around the Fresnel lens, the Fresnel lens including a smooth rear face and a front face comprising annular facets; and
a homogenizing lens physically coupled to the lens holder and optically coupled to the Fresnel lens, the homogenizing lens including a rear face comprising a homogenizing optical structure, the rear face of the homogenizing lens facing the front face of the Fresnel lens, wherein the homogenizing lens is physically coupled to the lens holder to reduce airflow around an edge of the homogenizing lens into an interior of the luminaire,
wherein the lens holder is configured to hold the Fresnel lens and the homogenizing lens in a fixed and spaced-apart relationship and to allow airflow between the Fresnel lens and the homogenizing lens.

11. The luminaire of claim 10, wherein the homogenizing lens is physically coupled to the lens holder at least by a seal configured to reduce passage of air around the edge of the homogenizing lens.

12. The luminaire of claim 11, wherein the seal comprises a gasket.

13. The luminaire of claim 11, wherein the Fresnel lens is physically coupled to the lens holder at least by a resilient material configured to allow airflow around the Fresnel lens.

14. The luminaire of claim 10, wherein the homogenizing lens comprises a smooth front face.

15. The luminaire of claim 10, wherein the homogenizing optical structure comprises raised dimples.

16. The luminaire of claim 10, wherein the homogenizing optical structure comprises a pattern of dimples, raised bumps, or other optical structure configured to homogenize light.

17. The luminaire of claim 10, wherein the homogenizing optical structure is formed of a material of the rear face or is a coating or thin layer applied on the rear face of the homogenizing lens.

18. The luminaire of claim 10, wherein the front face of the homogenizing lens comprises an anti-reflection coating, an oleophobic coating, a hydrophobic coating, a coating configured to strengthen the homogenizing lens, a coating configured to increase a resistance of the homogenizing lens to scratches, or a coating configured to reduce a buildup of dirt and dust on a surface of the homogenizing lens.

19. The luminaire of claim 10, further comprising:
a yoke assembly, wherein the head is rotatably mounted in the yoke assembly for rotation about a tilt axis.

20. The luminaire of claim 19, further comprising:
a base, wherein the yoke assembly is rotatably mounted to the base for rotation about a pan axis.

* * * * *